Patented Dec. 14, 1937

2,102,480

UNITED STATES PATENT OFFICE 2,102,480

ROAD COVERING

Hans Peter Karl Theodor Nielsen, Aabyhøj, Denmark, assignor to De jydske Skaervefabriker, Aarhus, Denmark No Drawing. Application May 31, 1935, Serial No. 24,424. In Denmark November 14, 1934

4 Claims. (Cl. 106—31)

The present invention relates to road coverings.

It is an object of the invention to provide a composition which may be deposited in a cold condition on roads, floors or the like. The composition is of that type wherein the main constituents are stone materials such as basalt, granite, gneiss, quartz, quartzite, flint, lime stone, blast furnace slag, steel furnace slag, etc. A bituminous binding agent is used such as, for instance, road tar or asphalt to which there may be added a suitable quantity of tar oil, mineral oil or the like.

For covering compositions of this type a bituminous binding agent must be used which has a melting point lying below 40° C. as measured by the ball and ring method. Such a binding agent has only to be heated to about 130° C. in order that proper mixing with the stone material may be effected, and yet the covering composition thus produced will be sufficiently plastic at normal temperatures (20–30° C.) so as to permit deposition in cold condition. Experience has however shown that the adherence of the binding agent to the stone material is rather low which permits the tar or asphalt film adhering to the individual stones to be relatively easily loosened by water. Therefore such covering compositions are not capable of resisting the action of water and humidity and this in conjunction with the action of traffic will tear individual stones or grains from the covering so as to gradually disintegrate such covering.

It is an object of the invention to provide a covering which eliminates the above disadvantage and in which the adherence between the binding agent and the stone material is so great that it is not possible for water to separate the film of binding agent from the surfaces of the stone.

It is an object of the invention to avoid the above disadvantage by adding dry humin substances to the covering composition such as finely ground peat, lignite, brown coal or coal. Humic acid or other humin substances which have been extracted from peat or lignite may also be used in place of the above mentioned materials. Experience has shown that the addition of such substances increases the adherence between the stone material and the binding agent greatly so that the binding agent will not be displaced by water even though the covering composition is subjected to the action of water for a long period.

It is an object of the invention to make it possible to employ binding agents having low melting points for road covering compositions with the same or even better results than that secured by employing hard tars or asphalts of far higher melting points which require heating in order to make deposition possible.

The material which is added such as powder of peat, lignite or the like may be mixed with the stone material and the binding agent which has not been heated above 130° C. in four different manners. This is preferably done in a mixing apparatus either by mixing all three constituents simultaneously or by first mixing two of them and then adding the third during further mixing. It is a further object of the invention to provide a process for the manufacture of a prepared stone material which is suitable for use in covering compositions. This process comprises mixing a stone material in dry state with a humin substance also in dry state and with a bituminous material in liquid state whereby the stone material is coated with a film of such mixture. In the manufacture of the covering composition the added substance may be a pure humin substance as humic acid, or materials containing humic such as finely ground peat, lignite, brown coal or coal. Such prepared stone material may sometimes be advantageously used instead of ordinary raw stone materials, which are often moist, which cause a poor adherence between the binding agent and the stone material. The employment of prepared stone material in accordance with the invention will provide excellent adherence between the bituminous binding agent and the stone material, which is due to the presence of the humin substance.

The stone material itself may be of any suitable kind, for instance broken stone, stone and gravel occurring in nature, blast furnace slag, steel furnace slag and the like. The manufacturing proper of the prepared stone material may be effected by mixing the humin substance, the binding agent and the stone material simultaneously or by mixing first any two of the constituents and then adding the third one during further mixing.

The quantity of binding agent with addition of humin substances used for preparing stone material may be relatively small, i. e. a few per cent by weight of the quantity of stone in such a manner that the stones will only get a very thin coating or the quantity may be greater, so that the individual stone grains are coated with a relatively heavy layer of the preparing agent.

The stone material thus more or less lightly coated with bitumen containing humin substances may later, in order to produce a covering composition adapted to be deposited in a cold state, be mixed with a further amount of a bituminous binding agent, as for instance road tar, asphalt, tar oil, mineral oil, emulsion or the like. This may be done for instance in a mixing machine and the product may be stored indefinitely and such product is also capable of withstanding long distance transportation without suffering any damage until the product is finally used in the manufacture of a road covering composition, an emulsion concrete or for a road surface treatment. A mixing with a further amount of binding agent may also take place on the road surface itself.

The preparation of the stone material according to the invention is normally effected with a bituminous binding agent, that is, liquid at lower temperatures. However if desired such stone material may also be preliminarily treated with a hard road tar or asphalt together with peat or lignite powder or the like. Such hard road tar or asphalt will require a relatively high temperature in order to render it capable of being mixed with the stone material. In order to obtain the final covering composition the stone material so prepared is mixed with a soft binding agent which will soften the harder binding agent contained in the film coating the stone material. The final covering composition produced in this manner will be quite similar to a covering composition manufactured directly with a soft binding agent and consequently in this case also adherence will be greatly increased.

I claim:

1. A process for the manufacture of a covering composition adapted to be deposited in cold state as a covering for roads and floors, comprising mixing a stone material with dry humin substances and with a bituminous binding agent, the melting-point of which measured by the ball and ring method lies below 40° C.

2. A process for the manufacture of a covering composition adapted to be deposited in cold state as a covering for roads and floors, comprising mixing a stone material with a dry, finely ground substance selected from the group consisting of peat, lignite, brown coal or coal, and with a bituminous material typified by road tar and asphalt and having a melting-point lying below 40° C. as measured by the ball and ring method.

3. A process for the manufacture of a prepared stone material adapted for the manufacture of a covering composition, comprising mixing a stone material in dry state with a humin substance in dry state and with a bituminous material in liquid state, thereby coating the stone material with a film of such mixture.

4. A process for the manufacture of a prepared stone material adapted for the manufacture of a covering composition by addition of a bituminous material, comprising mixing a stone material in dry state with a dry finely ground substance selected from the group consisting of peat, lignite, brown coal or coal and with a bituminous material in liquid state, thereby coating the stone material with a film of such mixture.

HANS PETER KARL THEODOR NIELSEN.

CERTIFICATE OF CORRECTION.

December 14, 1937.

Patent No. 2,102,480.

HANS PETER KARL THEODOR NIELSEN.

It is hereby certified that the name of the assignee in the above numbered patent was erroneously described and specified as "De Jydake Skaervefabriker" whereas said name should have been described and specified as De Jydske Skaervefabriker, as shown by the record of assignments in this office; and that the said Letters Patent should be read with this correction therein that the same may conform to the record of the case in the Patent Office.

Signed and sealed this 1st day of March, A. D. 1938.

Henry Van Arsdale,
Acting Commissioner of Patents.

(Seal)